United States Patent
Severson et al.

(10) Patent No.: US 6,483,300 B1
(45) Date of Patent: Nov. 19, 2002

(54) SPIN-STAND HAVING A DISC HEATER

(75) Inventors: Gregg J. Severson, Prior Lake, MN (US); James H. McGlennen, Eden Prairie, MN (US); Daniel J. Brown, St. Anthony, MN (US); Thomas S. Rasmussen, Kasson, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/730,182

(22) Filed: Dec. 5, 2000

Related U.S. Application Data
(60) Provisional application No. 60/181,028, filed on Feb. 8, 2000.

(51) Int. Cl.[7] .............................................. G01R 33/12
(52) U.S. Cl. .................................... 324/212; 360/97.03
(58) Field of Search ................................ 324/212, 210, 324/224, 262, 760, 226, 227; 360/105, 137, 97.03; 236/37

(56) References Cited

U.S. PATENT DOCUMENTS

| | | | |
|---|---|---|---|
| 3,726,125 A | 4/1973 | Heyman ..................... | 73/15 R |
| 4,902,971 A | 2/1990 | Guzik et al. ................ | 324/212 |
| 5,254,946 A | 10/1993 | Guzik ......................... | 324/262 |
| 5,382,887 A | 1/1995 | Guzik et al. ................ | 318/652 |
| 5,451,884 A | 9/1995 | Superland ................... | 324/760 |
| 5,721,488 A | 2/1998 | Sakai et al. ................. | 324/210 |
| 5,801,531 A * | 9/1998 | Viches et al. ................ | 324/212 |
| 5,851,143 A | 12/1998 | Hamid .......................... | 454/57 |
| 5,903,163 A | 5/1999 | Tverdy et al. ............... | 324/760 |

FOREIGN PATENT DOCUMENTS

| | | | | |
|---|---|---|---|---|
| JP | 363234487 A | * | 9/1988 | ................ 360/137 |

OTHER PUBLICATIONS

U.S. Provisional Patent Application of Gregg J. Severson, James H. McGlennen, and Daniel J. Brown, Ser. No. 60/181,028, filed Feb. 8, 2000, entitled Method For Real–Time Thermal Media Decay Testing.

* cited by examiner

*Primary Examiner*—Edward Lefkowitz
*Assistant Examiner*—Subhash Zaveri
(74) *Attorney, Agent, or Firm*—Westman, Champlin & Kelly

(57) ABSTRACT

The present invention is directed to a disc heater for use with a spin-stand. The disc heater is adapted to heat a disc that is mounted to a spindle of the spin-stand. The disc heater includes a heater support, a heater, and a controller. The heater support is couplable adjacent the spindle and the disc and is adapted to support the heater near a surface of the disc. The heater produces heat that raises at least a surface of the disc to a temperature that simulates an operating temperature of a disc drive. The controller is electrically coupled to the heater and controls the heat produced by the heater. The spin-stand is adapted to perform various tests on the transducing head. Additional tests, such as accelerated aging studies, can also be performed on the disc.

20 Claims, 6 Drawing Sheets

SPIN-STAND HAVING A DISC HEATER

CROSS-REFERENCE TO RELATED APPLICATION

This application claims the benefit of U.S. Provisional Patent Application No. 60/181,028, entitled "METHOD FOR REAL-TIME THERMAL MEDIA DECAY TESTING," filed on Feb. 8, 2000.

FIELD OF THE INVENTION

The present invention is related to disc drive testing. In particular, the present invention is related to a disc heater for use with a spin-stand.

BACKGROUND OF THE INVENTION

In a computer disc drive, data is stored on a computer disc in concentric tracks. In many drives, the data is stored using a write head that changes the physical property of the disc. The data is read from the disc by positioning a read head over a desired track and sensing the physical properties of the disc along the track. For example, in a magnetic disc drive, the read head senses magnetic moment boundaries along the disc.

The process for producing a read head or a write head varies depending on the type of read head or write head being produced. Nonetheless, all head manufacturing methods share common characteristics, such as high degree of manufacturing complexity, small feature sizes, and a susceptibility to manufacturing errors. Because of this, each production method generates a significant number of heads that do not meet specifications. In order to detect faulty heads accurately, the transducing heads must be tested over a disc surface. In particular, each transducing head must be flown over a disc surface while it performs writing and/or reading operations. Early in the disc drive manufacturing art, this type of testing was performed after the head was assembled in a complete disc drive. However, this in-drive testing proved to be unacceptable because the disc drive had to be rebuilt if the head was found to be faulty.

To overcome the inefficiencies of in-drive testing, the art developed a "spin-stand", which allowed the head to be tested before it was placed in a disc drive. In general, a spin-stand includes a spinning computer disc and a mounting support that supports the head and moves the transducing head to a desired position over the spinning disc. The spin-stand allows a series of tests to be performed on the transducing head including, for example, error-rate testing, pulse width-fifty testing, track average amplitude testing, and track scan testing.

Under normal operating conditions, the internal temperature of a disc drive can reach as high as 75° Celsius. This high operating temperature can affect the ability of the transducing head to perform read and write operations. Also, the high temperature can cause a magnetization pattern on the disc to degrade over time. One apparatus used to simulate these worst-case conditions is a test chamber, which can house a plurality of disc drives in a near worst-case environment. One example of such a disc drive test chamber is described in U.S. Pat. No. 5,851,143 to Hamid. Unfortunately, these test chambers provide in-drive testing of disc drives at near worst-case conditions, rather than the generally more desirable outside-drive testing that can be conducted on spin-stand.

There is a need for a spin-stand tester that is capable of simulating near worst-case conditions for analyzing the performance of disc media and transducing heads.

SUMMARY OF THE INVENTION

The present invention is directed to a disc heater for use with a spin-stand. The disc heater is adapted to heat a disc that is mounted to a spindle of the spin-stand. The disc heater includes a heater support, a heater, and a controller. The heater support is couplable adjacent the spindle and the disc and is adapted to support the heater near a surface of the disc. The heater produces heat that raises at least a surface of the disc to a temperature that simulates an operating temperature of a disc drive. The controller is electrically coupled to the heater and controls the heat produced by the heater. The spin-stand is adapted to perform various tests on the transducing head. Additional tests, such as accelerated aging studies, can also be performed on the disc.

Another aspect of the present invention is directed to a spin-stand that includes a disc heater

DETAILED DESCRIPTION OF ILLUSTRATIVE EMBODIMENTS

Figure 1:
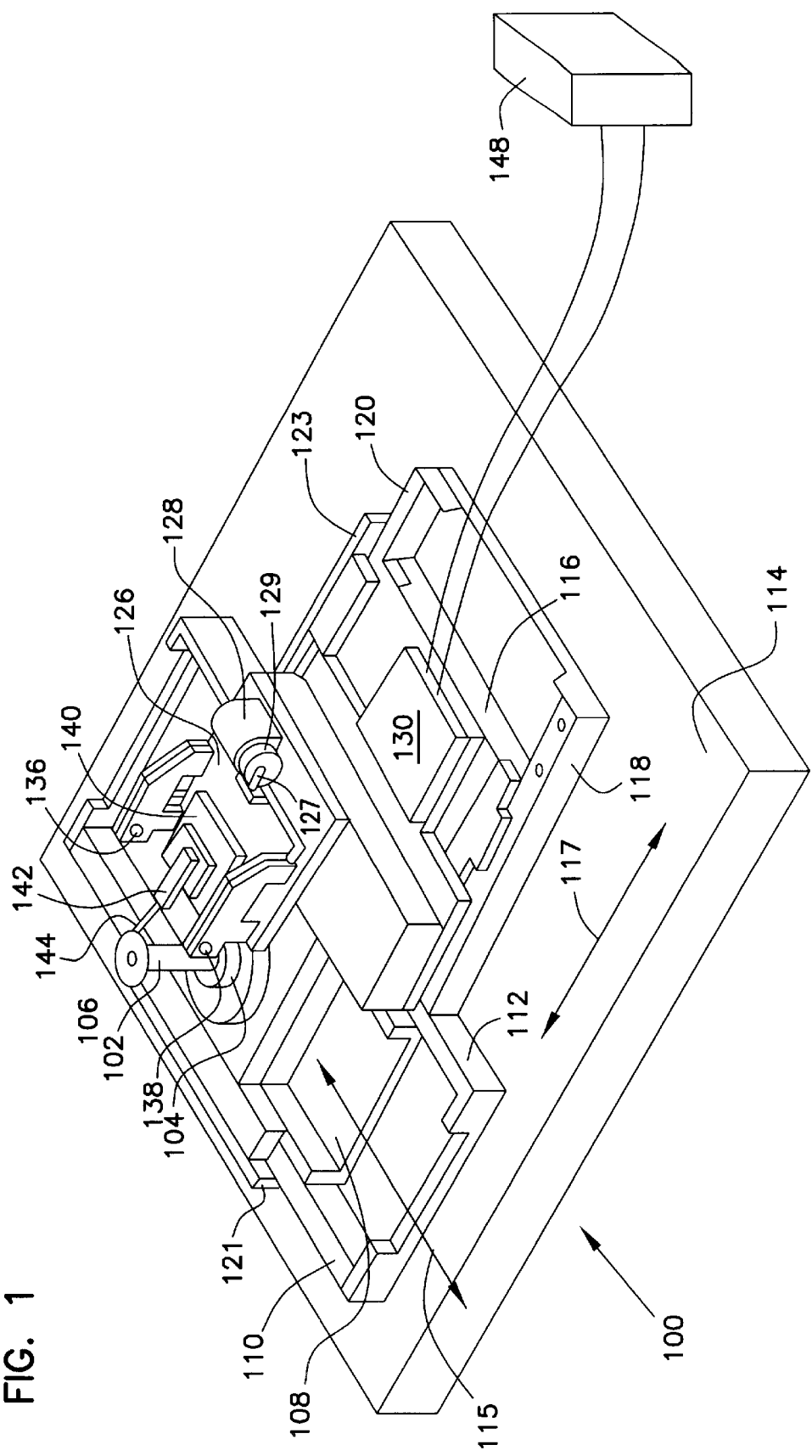
FIG. 1 is a perspective view of an example of a spin-stand with which the present invention may be used.

The present invention relates to a disc heater that is adapted to heat a disc and/or a transducing head of a spin-stand to thereby provide a means for testing the disc and the transducing head under near worst-case disc drive operating conditions and for performing accelerated aging studies. FIG. 1 is a perspective view of an example of a spin-stand 100 with which the disc heater of present invention can be used. Spin-stand 100 includes disc 106 mounted on spindle 102, which is rotated by spindle motor 104. Spindle motor 104 rests on platform 108 which moves between guide rails 110 and 112. Platform 108 can be supported by a cushion of air during movement and can be stabilized in a particular position by the application of a vacuum between platform 108 and granite face 114 located directly below platform 108. For purposes of reference, movement of platform 108 along guides 110 and 112 is considered to be in the "X" direction as shown by arrows 115. A position encoder 121 can be located, for example, along guide 110 to provide an indication of the position of platform 108.

Spin-stand 100 also includes a carriage 116 that moves between rails 118 and 120 in the "Y" direction as indicated by arrows 117. Similar to platform 108, carriage 116 can be supported by a cushion of air during movement and can be locked into position by applying a vacuum between carriage 116 and granite base 114. A position encoder 123 can be located, for example, along guide 120 to provide an indication of the position of platform 116.

Carriage 116 and platform 108 both move using electromotive motors mounted between one of the guide rails and the respective platform or carriage. Other types of motors, such as a stepper motor, may be used in place of the electromotive motors. These motors generally perform course adjustment of head suspension 144 which is connected to a suspension chuck 142. Suspension chuck 142 is mounted to piezo platform 140. Piezo platform 140 is connected to suspension chuck 142 through piezo elements that are able to move suspension 142 in the X direction to perform fine adjustment of a transducing head, held by suspension 144, with respect to disc 106. During head loading operations, pivot motor 128 rotates eccentric cam 129 causing lever arm 127 and the back end of pivoting platform 126 to rotate upward about pivot pins 138 and 136. Suspension chuck 142, which carries suspension 144, is then placed on piezo platform 140 and spindle motor 104 is activated so that disc 106 rotates at a desired speed. Carriage 116 can be moved forward so that a head at the end of suspension 144 moves under the spinning disc 106. Support platform 108 is also moved so that the head is positioned at a desired radius along disc 106. When the head nears the desired location relative to disc 106, motor 128 rotates eccentric cam 129 back so that pivoting platform 126 returns to its level position and the head is brought into proximity with disc 106. The head on suspension 144 then flies over the surface of disc 106.

The head on suspension 144 is connected by electrical leads to printed circuit 130, which has further connections to control box 148. Control box 148 controls the positioning of the head on suspension 144 and the types of tests that are performed on the head. In particular, control box 148 designates the location for the test track, the data to be written to the disc, and the position of the read head within the written track during read back of the test data. Using the piezo elements of piezo platform 140, the read head can be moved to a number of different locations within a track during read back, so that a profile of the read head can be determined.

The above-described example of a spin-stand 100 can be configured to position the transducing head using an open-loop servo system that does not measure the position of the head relative to disc 106. Instead, the open-loop system passes control signals to the piezo element of piezo platform 140 and calculates the position of the head based on how the piezo element is expected react to those signals. Alternatively, spin-stand 100 can use a closed-loop servo system to keep the head at a desired position relative external visible guides. Here, the position of the head is measured using sensors which are external to the head and then apply a feedback signal to the servo elements to move the head to the desired position. These system are unable to determine the position of the head relative to a written track on the disc.

Figure 2:
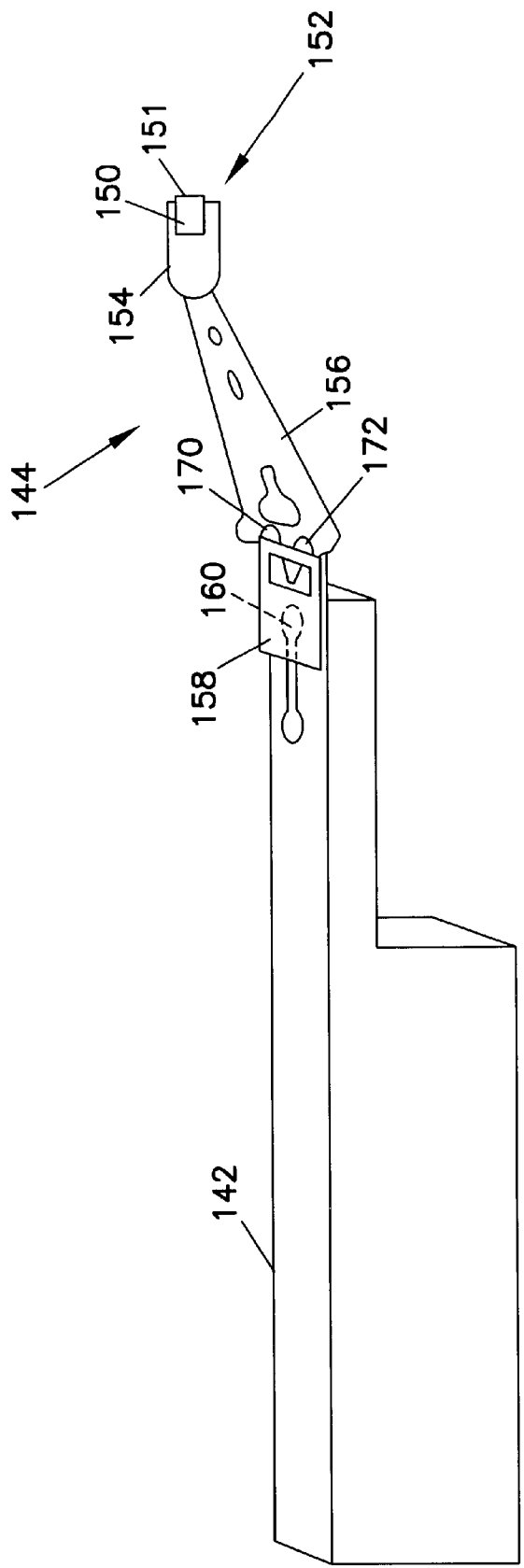
FIG. 2 is a perspective view of suspension chuck and a suspension in accordance with an embodiment of the invention.

With each new generation of disc drives, the density of tracks on the disc has increased causing a corresponding decrease in the width of the read and write heads. Because of this, positioning a head within a track using the above-described methods on a spin-stand, such as spin-stand 100, has become increasingly difficult. For better track positioning, head suspension 144 of spin-stand 100 can include a positioning system that uses, for example, microactuators 170 and 172 for performing track following, as shown in the more detailed perspective view of suspension chuck 142 and suspension 144 in FIG. 2. Suspension 144 includes gimbal 154 that is connected to slider 150 containing transducing head 151 on a trailing edge 152. Suspension 144 also includes a flexure arm 156 and a base plate 158 which connects to suspension chuck 142 using boss 160.

Microactuators 170 and 172 are mounted to flexure arm 156 and are capable of contracting or expanding to arcuately move head 151 over a surface of disc 106. Other configurations are possible for head suspension 144 which can provide the desired track following capability. Track following is performed in this embodiment of spin-stand 100 using a closed-loop servo system in accordance with various known methods. These methods generally require the test tracks on disc 106 to include servo regions which are used to perform the track following, rather than simply test data as in the case where spin-stand 100 is incapable of performing track following.

Figure 3:
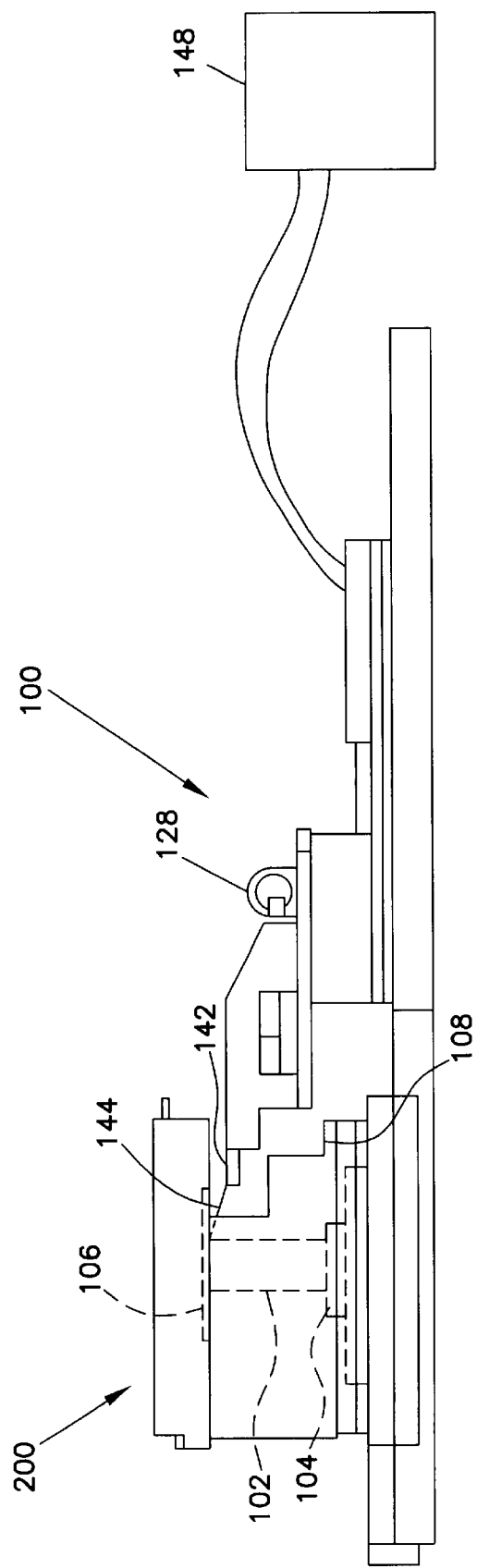
FIG. 3 is a side view of a spin-stand in accordance with an embodiment of the invention.
Figure 4:
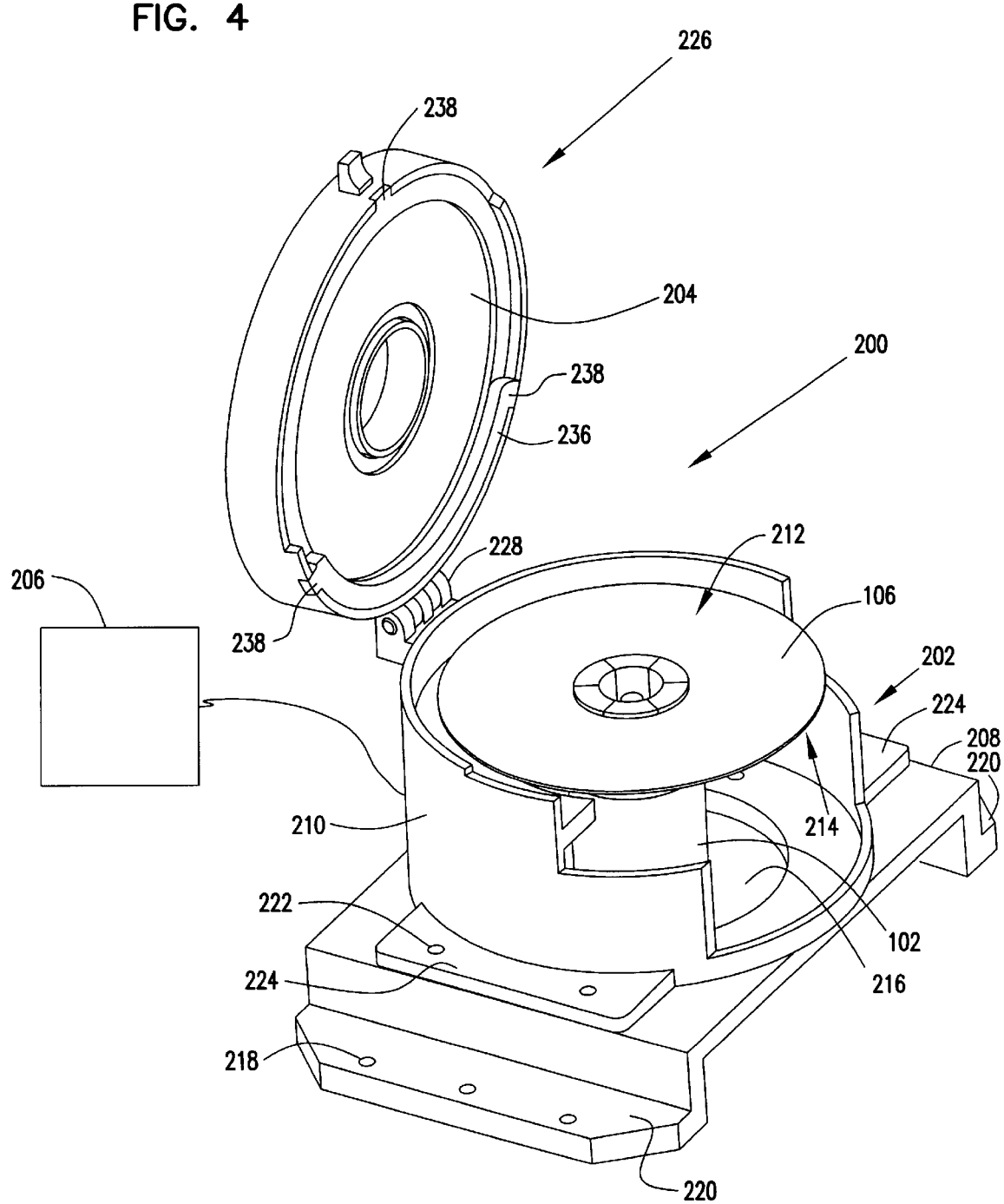
FIG. 4 is a perspective view of a disc heater mounted adjacent to a spindle and a disc of a spin-stand in accordance with various embodiments of the invention.
Figure 5:
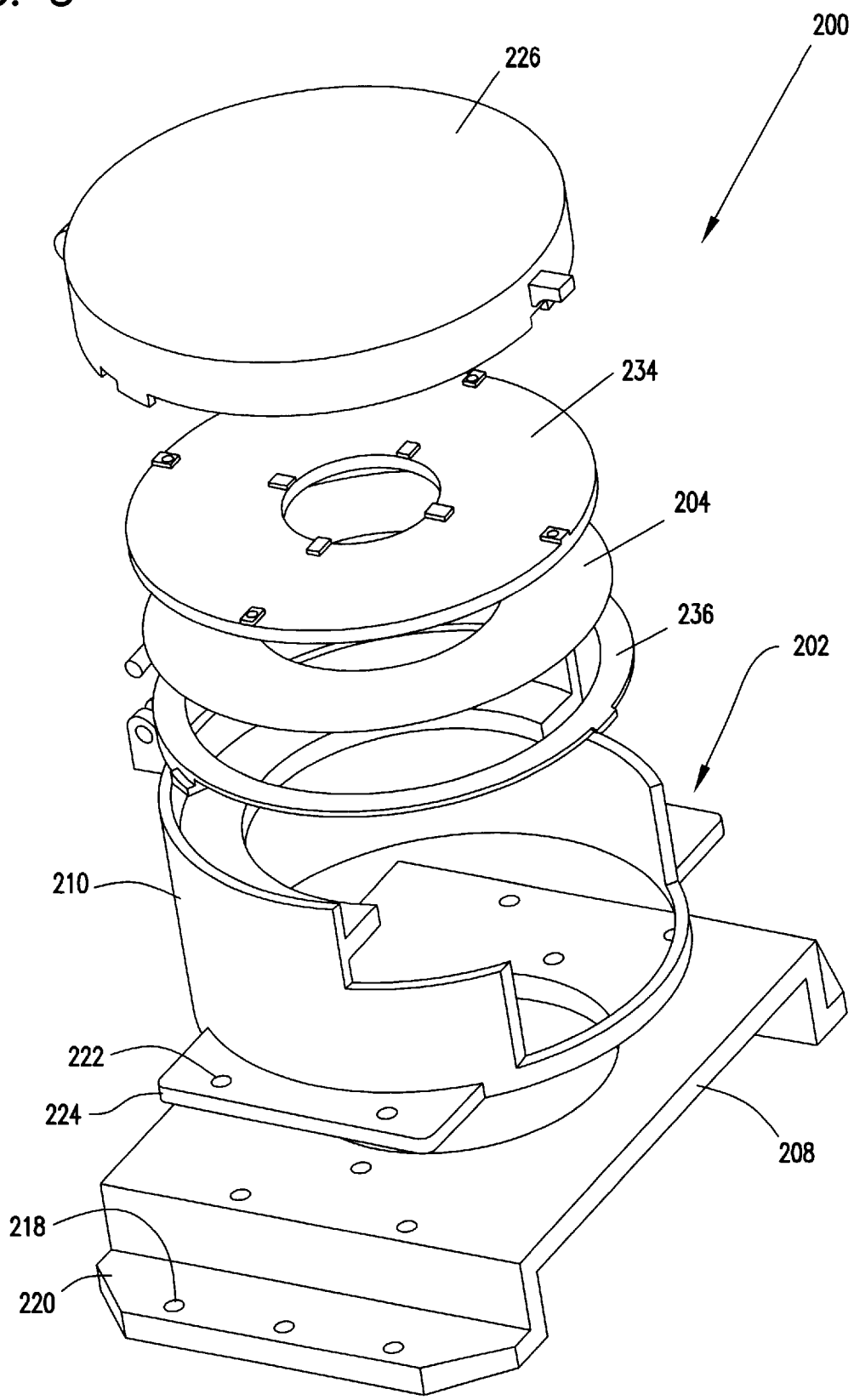
FIG. 5 is an exploded perspective view of a disc heater in accordance with various embodiments of the invention.
Figure 6:
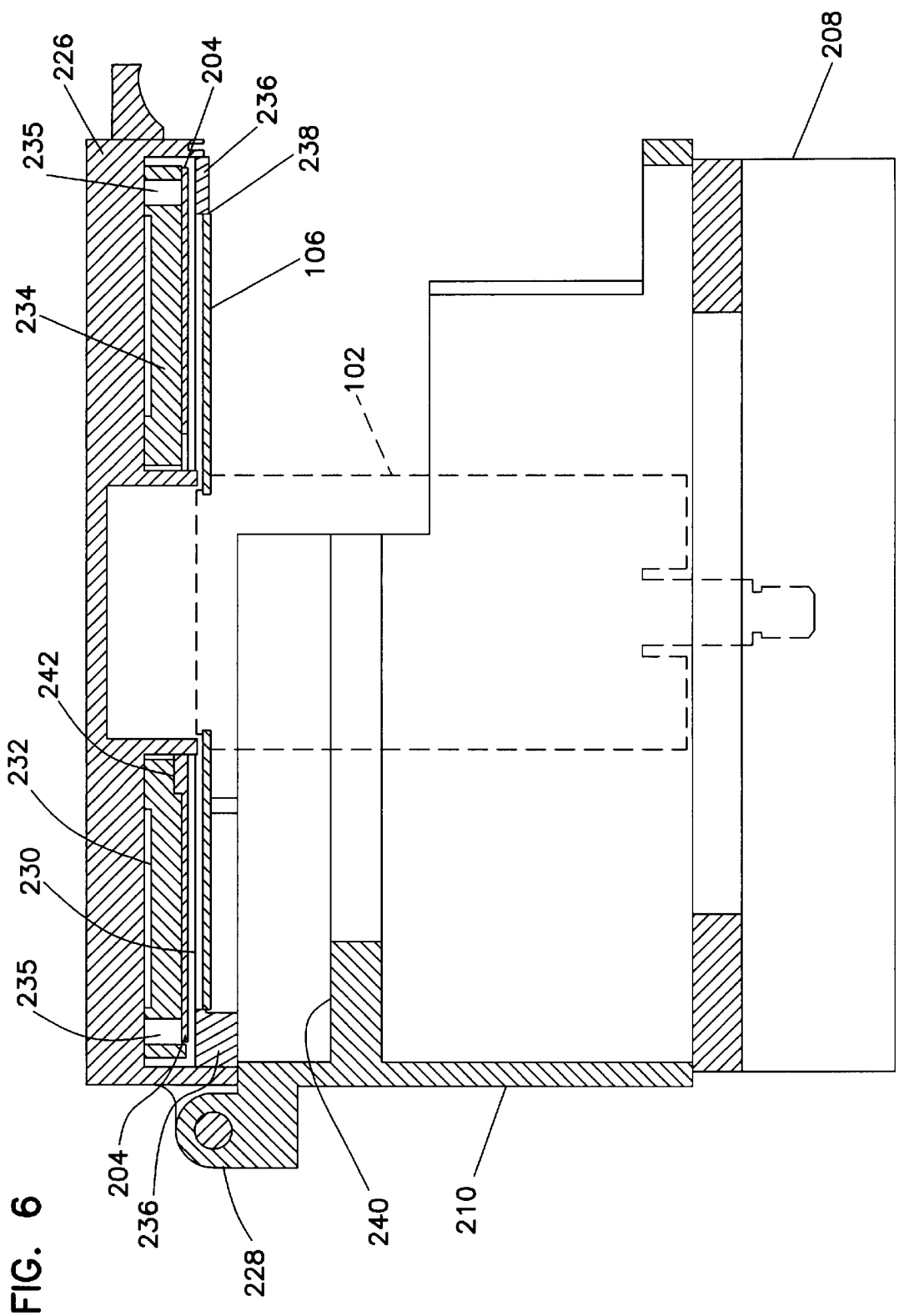
FIG. 6 is a cross-sectional view of a disc heater in accordance with various embodiments of the invention.

FIG. 3 shows a side view of disc heater 200 mounted on spinstand 100. Disc heater 200 can be a fixed component of spin-stand 100 or an add-on component that can be installed on an existing spin-stand 100. Referring now to FIGS. 4–6, disc heater 200 generally includes heater support 202, heater 204, and controller 206. Heater support 202 includes base 208 and housing 210 and is configured to position heater 204 proximate either top surface 212, as shown in FIG. 4, bottom surface 214, or both top and bottom surfaces 212 and 214 of a disc 106 that is mounted to spindle 102. Base 208 and housing 210 can include an opening 216 which allows heater support 202 to be mounted over spindle 102 when disc 106 is not present. Disc heater 202 can be removably secured to spin-stand 100 with, for example, screws which attach to platform 108 through apertures 218 of feet 220 of base 208. Similarly, housing 210 can be mounted to base 208 with screws through apertures 222 of flanges 224 of housing 210. One embodiment of heater support 202 includes lid 226 which is adapted to hold heater 204 above top surface 212 of disc 106.

In one embodiment, lid 226 includes an annular cavity 232 in which heater 204 is mounted. Lid 226 can be rotatably coupled to housing 210 using hinge 228. Hinge 228 allows lid 226 to be moved between an open position (FIG. 4) and a closed position (FIG. 6). In the depicted embodiment, heater 204 substantially covers top surface 212 of disc 106 when lid 226 is in the closed position.

It is desirable to reduce heat loss as much as possible to maximize the heat transfer from heater 204 and disc 106. In one embodiment, top cavity 230 is formed between heater 204, lid 226, and disc 106, which preferably has few gaps through which heat can escape. However, since discs 106 that are to be tested on spin-stand 100 can have different outer diameters, a gap can form between peripheral edge 238 of disc 106 and lid 226. This problem is solved using insulating ring 236 which mounts to lid 226 and is adapted to reduce the gap formed between lid 226 and peripheral edge 238 of disc 106. Insulating ring 236 is preferably formed of a suitable insulating material, such as machinable ceramic, and is axially aligned and coplanar with disc 106 when lid 226 is in the closed position. The inner diameter of insulating ring 236 is slightly larger than the outer diameter of disc 106 so that it does not interfere with the spinning of disc 106. Insulating ring 236 is preferably removably coupled to lid 226 to allow insulating ring 236 to be replaced by a suitably sized insulating ring 236 in accordance with the size of the disc 106 that is to be tested. In one embodiment, insulating ring 236 includes mounting portions 238, which can be removably fastened to lid 226 using a suitable fastener, such as screws.

To further reduce heat loss, one embodiment of the invention includes insulating member 234 mounted within annular cavity 232 of lid 226. Insulating member 234 is formed of a material having a low thermal conductivity, such as ceramic, to reduce the transfer of heat from heater 204 to lid 226. Insulating member 234 can be fastened to lid 226 with screws (not shown) through bores 235 (FIG. 6).

A heater 204 can also be placed below disc 106 to heat bottom surface 214 by supporting heater 204 on ledge 240 of housing 210. The position and shape of heater 204 must be such that it does not interfere with the positioning of head suspension 144. One advantage to having heater 204 positioned to heat top surface 212 of disc 106 is that it can be placed in close proximity to, and substantially cover, disc 106 without interfering with the movements of head suspension 144. In addition, this configuration reduces the heat that is transferred to spindle 102, which is desirable.

Heater 204 is preferably capable of heating disc 106 to more than 75° C. In one embodiment, heater 204 is formed of a thermal-conductive material having integral heating elements. One preferred thermal-conductive material is Kapton® polyimide film manufactured by DuPont. Heater 204 can also be formed of heat lamps (not shown) or other suitable heating elements. As mentioned above, heater(s) 204 can be attached to heater support 202 such that it is positioned proximate top surface 212 and/or bottom surface 214 of disc 106. In one embodiment, heater 204 is adapted to be fastened to either lid 226 or insulating member 232 (FIG. 6) using an appropriate adhesive or other suitable fastener. It is preferred, however, that the fastener used to attach heater 204 is one that does not produce excessive emissions which could contaminate disc 106 and transducing head 151.

In addition to understanding that many different types of heating elements could be used to form heater 204, those skilled in the art also understand that other configurations are possible for heater 204 that would result in the desired heating of disc 106. For example, heater 204 could be mounted to the side of disc 106 and include a slot that surrounds disc 106 and includes heating elements to heat disc 106 as it passes through the slot. Also, a heater 204 could be placed both above and below disc 106 to simultaneously heat top surface 212 and bottom surface 214 of disc 106. Furthermore, although heater 204 is preferably shaped to conform to the surface of disc 106 that is to be heated, another possible configuration could use a heater 204 that is designed to heat only a small segment of disc 106. Here, the rotation of disc 106 would cause disc 106 to heat substantially evenly.

Controller 206 (FIG. 4) is generally configured to regulate the power provided to heater 204 and thereby control the amount of heat produced by heater 204. Electrical connections between controller 206 and disc heater 200 are indicated generally by wire 241 in FIG. 4 and internal connections are not shown in FIG. 6 to simplify the illustration. Spin-stand 100 can be adapted to include connections which couple to heater 204 and allow control box 148 to regulate the power to heater 204.

Controller 206 could be a computer that is adapted to control a power supply (not shown) which controls the heat produce by heater 204. Also, controller 206 can be adapted to perform test procedures in accordance with a test program. For example, controller 206 could be programmed to heat disc 106 to a given temperature for a specified duration in accordance with a test procedure.

Disc heater 200 can include temperature sensor 242 (FIG. 6) that is adapted to sense the temperature of heater 204 or top cavity 230. Temperature sensor 242 could also be placed proximate top surface 212 or bottom surface 214 of disc 106 to measure the temperature of disc 106. Additional temperature sensors can be used to perform multiple temperature measurements at any of the above-mentioned locations or wherever a temperature measurement is desired. Temperature sensor 242 can be a thermocouple, a resistive temperature detector (RTD), and any other suitable temperature sensor. Temperature sensor 242 is generally adapted to produce an output signal related to the temperature being sensed. The output signal from temperature sensor 242 can be provided to controller 206 (electrical connection not shown) or control box 148 which can use the temperature output signal as a feedback signal for controlling the temperature of disc 106, to collect data during a test, and other purposes.

Disc heater 200 allows a user to test the performance of a transducing head and a computer disc under near-worst case conditions. For example, tests can be conducted to analyze read and write performance of the transducing head at near worst-case operating temperatures. Also, as computer discs age the magnetization patterns on the discs tend to degrade. Disc heater 200 provides a means for testing this thermal decay on a spin-stand. Additionally, accelerated aging studies can be conducted on the transducing head and the computer disc by elevating the temperature beyond the normal operating temperature (typically 60–75° C.) of the related disc drive. Additional worst-case conditions, such as high humidity, could be added by controlling the environment in which spin-stand 100 and disc heater 200 are used.

In summary, the present invention is directed to a disc heater 200 for use with a spin-stand tester 100. The spin-stand tester 100 generally includes a disc 106 mounted to a spindle 102 and a transducing head 151 positionable adjacent a data surface 214 of the disc 106. The disc heater 200 includes a heater support 202, a heater 204, and a controller 206. The heater support 202 is couplable to the spin-stand tester 100 adjacent the spindle 102 and the disc 106. The heater 204 is adapted to heat a surface of the disc 106 and is controlled by the controller 206.

Another aspect of the invention is directed toward a spin-stand 100 used to test a head 151 outside of a disc drive. The head 151 is mounted to a head suspension 144 and can be moved using a suitable positioning system. A servo system, adapted to feed control signals to the positioning system, is used to control the position of the head 151 relative to the disc 106. Finally, a disc heater 200 is used to heat at least one surface (212 or 214) of the disc 106.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed.

What is claimed is:

1. A spin-stand for testing disc drive components at near worst-case operating conditions, comprising:

a disc mounted to a spindle and rotated by a spindle motor;

a suspension supporting a transducing head over the disc;

a heater support positioned adjacent the spindle and the disc;

a heater coupled to the heater support and adapted to heat a surface of the disc; and a controller electrically coupled to the heater for controlling the amount of heat produced by the heater.

2. The spin-stand of claim 1, wherein the heater support includes:
   a base having a bore through which the spindle extends; and
   a housing coupled to the base and adapted to at least partially insulate the disc without interfering with the transducing head.

3. The spin-stand of claim 2, wherein the heater support further comprises a lid coupled to the housing and adapted to insulate a top surface of the disc; the lid and the disc defining a top cavity.

4. The spin-stand of claim 3 including an insulator ring axially aligned and substantially coplanar with the disc to reduce heat loss from the top cavity.

5. The spin-stand of claim 2, wherein the housing includes an opening for positioning the transducing head adjacent a data surface of the disc.

6. The spin-stand of claim 1, wherein the heater support further comprises a lid adapted to insulate the top surface of the disc, the lid and the disc defining a top cavity.

7. The spin-stand of claim 6, wherein the heater is coupled to the lid.

8. The spin-stand of claim 6, wherein the lid includes an insulating member and the heater is coupled to the insulating member.

9. The spin-stand of claim 8, wherein the insulating member is formed of ceramic.

10. The spin-stand of claim 1, wherein the heater is adapted to heat at least one of a top surface and a bottom surface of the disc.

11. The spin-stand of claim 1, wherein the heater is adapted to heat a surface of the disc that is opposed to a data surface.

12. The spin-stand of claim 1, wherein the heater includes a thermal conductive film having integral heating elements.

13. The spin-stand of claim 12, wherein the thermal conductive film is formed of polyimide.

14. The spin-stand of claim 1, wherein the heater is annularly shaped to substantially cover the surface of the disc.

15. The spin-stand of claim 1, wherein the heater includes heat lamps.

16. The spin-stand of claim 1, further comprising a temperature sensor having an output signal related to a temperature of at least one of the heater and the disc.

17. The spin-stand of claim 16, wherein the controller controls the heater based upon the output signal.

18. The spin-stand of claim 1, wherein the heater is configured to heat the disc to at least 60° Celsius.

19. A spin-stand for testing a head and a disc outside of a disc drive, the head being mounted on a head suspension, the spin-stand comprising:
   a spindle adapted to rotate the disc;
   a positioning system capable of moving the head relative to the disc;
   a servo system adapted to feed control signals to the positioning system to control the position of the head relative to the disc; and
   a disc heater adapted to heat at least one surface of the disc.

20. A spin-stand for testing a head and a disc outside of a disc drive comprising:
   head testing means for supporting and testing the head;
   a spindle adapted to rotate the disc; and
   heating means for heating a surface of the disc.

* * * * *